(12) United States Patent
Kaku

(10) Patent No.: US 6,728,471 B1
(45) Date of Patent: Apr. 27, 2004

(54) IMAGE REPRODUCING APPARATUS

(75) Inventor: Junya Kaku, Itami (JP)

(73) Assignee: Sanyo Electric Co., LTD, Moriguchi (JP)

( * ) Notice: Subject to any disclaimer, the term of this patent is extended or adjusted under 35 U.S.C. 154(b) by 0 days.

(21) Appl. No.: 09/406,818

(22) Filed: Sep. 28, 1999

(30) Foreign Application Priority Data

Sep. 29, 1998 (JP) .......................................... 10-274480

(51) Int. Cl.[7] .................................................. H04N 5/91
(52) U.S. Cl. ............................ 386/68; 386/111; 386/112
(58) Field of Search ........................... 386/46, 68, 111, 386/112, 125, 52, 120, 121

(56) References Cited

U.S. PATENT DOCUMENTS 5,923,817 A * 7/1999 Nakamura ................... 386/124
5,991,503 A * 11/1999 Miyasaka et al. ........... 386/111
6,148,031 A * 11/2000 Kato ............................ 386/52

* cited by examiner

*Primary Examiner*—Huy Nguyen
(74) *Attorney, Agent, or Firm*—Armstrong, Kratz, Quintos, Hanson & Brooks, LLP

(57) ABSTRACT

An image reproducing apparatus includes an interface connected with a memory card recorded with a motion image file formed by a plurality of still image files. In a reproduce mode, still image files are continuously reproduced from the memory card to display a corresponding motion image on a monitor. When normal reproduction is instructed, decompression is made for each still image file in response to vertical synchronizing signal. As a result, motion images are reproduced at a normal rate. On the other hand, when high speed reproduction is instructed, after compression has been completed for a current still image file, a next still image file is promptly started of compression. Due to this, motion images are reproduced at high speed.

7 Claims, 4 Drawing Sheets

IMAGE REPRODUCING APPARATUS

BACKGROUND OF THE INVENTION

1. Field of the Invention

This invention relates to image reproducing apparatuses and, more particularly, to an image reproducing apparatus which is applicable to a digital camera for continuously reproducing a plurality of-still image signals having been recorded by compression.

2. Description of the Prior Art

In the conventional image reproducing apparatuses of this kind, a plurality of still image signals are reproduced in order to provide motion images. In both cases of normal and high speed reproductions, it has been a practice to implement decompression on still image signals responsive to vertical synchronizing signals. In the normal reproduction, all the still image signals are decompressed every 1-frame period so that motion images can be reproduced at a normal rate. During high-speed reproduction, the still image signals to be decompressed are selected for example every other screen, i.e., time lapse operation for reproduction images, realizing high-speed reproduction of motion images.

Thus, in high speed reproduction, reproduction images undergo such time-lapse operation. This however results in a fear that an operator be not allowed to access a desired image. Moreover, the subject images are rendered awkward in motion due to time-lapse operation.

SUMMARY OF THE INVENTION

Therefore, it is a primary object of present invention to provide an image reproducing apparatus which is capable of reproducing all the still image signals regardless of the speed of reproduction.

According to the present invention, an image reproducing apparatus for continuously reproducing a plurality of still image signals recorded in a compression state, comprises: a decoder for decompressing one screen of the still image signals in response to a decompression instruction; a first instruction key for instructing normal reproduction; a first processor for generating the decompression instruction at a predetermined interval when the normal reproduction is instructed; a second instruction key for instructing high speed reproduction; and a second processor for generating the decompression instruction each time the one screen of still image signals is completed of decompression, when the high speed reproduction is instructed.

In one embodiment of the invention, a signal generator outputs timing signals at an interval of a predetermined frame period, wherein the first processor generates the decompression instruction in response to the timing signal.

In another embodiment of the invention, the decoder includes an end signal output circuit to output end signals each time one screen of still image signals have been decompressed, and the second processor generating the decompression instruction in response to the end signal.

In still another embodiment of the invention, if a mode set key sets a reproduce mode, a first memory controller writes the still image signals to the memory. A second memory controller reads from the memory the one screen of still image signals to be sent to the decoder based on the decompression instruction.

In a further embodiment of the invention, the still image signals are signals having been compressed on a screen-by-screen basis through a JPEG scheme. The still image signals constitute a motion image.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
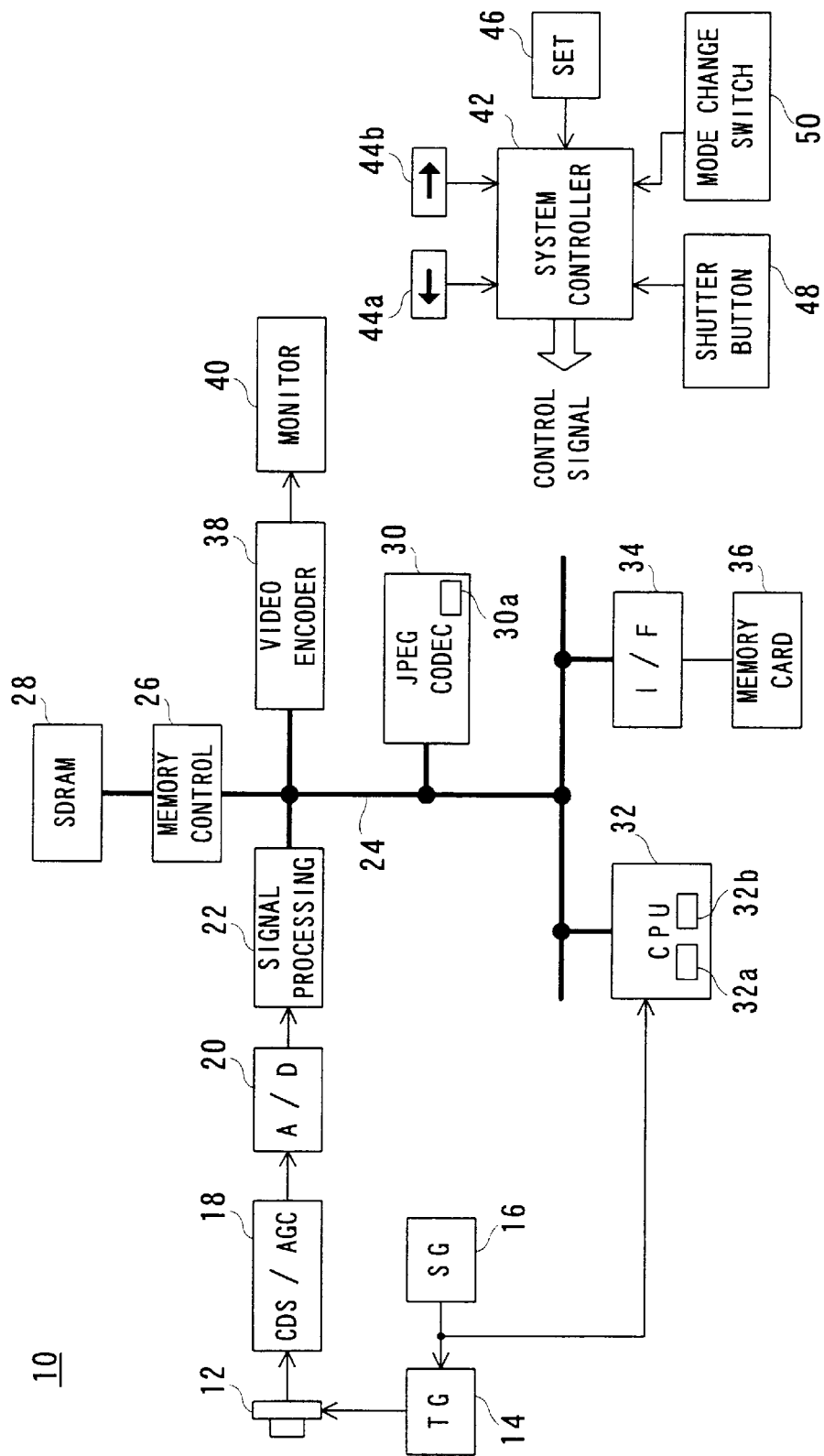
FIG. 1 is a block diagram showing one embodiment of present invention.

Referring to FIG. 1, a digital camera 10 of this embodiment includes a CCD imager 12. The CCD imager 12 has a color filter (not shown) arranged at a front thereof so that a subject image can be taken through the color filter to the CCD imager 12.

If a mode set switch 50 is switched to a "CAMERA" side, a system controller 42 sets for a camera mode. A timing generator (TG) 14 creates a timing signal based on vertical and horizontal synchronizing signals outputted from a signal generator (SG) 16, thereby driving the CCD imager 12 by a progressive scan scheme. As a result, a subject camera signal is outputted from the CCD imager 12. The output camera signal is subjected to well-known noise removal and level adjustment by a CDS/AGC circuit 18, and then converted into camera data as a digital signal by an A/D converter 20. A signal processing circuit 22 performs YUV conversion on the camera data outputted from the A/D converter 20, thereby creating YUV data.

The created YUV data is delivered to a memory control circuit 26 through a bus 24, and written to an SDRAM 28 by the memory control circuit 26. That is, the CCD imager 12 adopts a progressive scan scheme, whereas the monitor 40 uses an interlace scan scheme. Consequently, the YUV data is temporarily stored into the SDRAM 28 for the purpose of scanning scheme conversion. The stored YUV data is thereafter read out through an interlace scan scheme by the same memory control circuit 26, and sent to a video encoder 38 via a bus 24. The video encoder 38 creates a composite video signal conforming to an NTSC format from the input YUV data, and inputs the created composite video signal to a monitor 40. As a result, subject motion images are displayed real time on the monitor 40.

If an operator manipulates a shutter button 48, a subject motion image is recorded onto a memory card 36. Specifically, if the operator depresses once a shutter button 48, a CPU 32 sends a compression instruction to a JPEG CODEC 30. The JPEG CODEC 30, in turn, outputs to the memory control circuit 26 a request to read the YUV data. The memory control circuit 26 reads out 1 frame of YUV data, i.e. 1 screen of still image data, in response to the read request. The JPEG CODEC 30 performs JPEG compression on the YUV data read out by the memory control circuit 26. In the JPEG CODEC 30, one compression creates compression image files (still image files) in an amount of 1 screen. The JPEG CODEC 30 supplies a still image file thus created, together with a write request, to the memory control circuit 26. Accordingly, the still image file also is temporarily stored in the SDRAM 28.

Unless the shutter button 48 is again depressed by the operator, the CPU 32 repeatedly sends compression instructions to the JPEG CODEC 30. This creates a plurality of still image files to be accumulated within the SDRAM 28. That is, still image files are successively accommodated in a motion image file created within the SDRAM. When the shutter button 48 is depressed, the CPU 32 suspends the output of compression instructions and sends to the memory control circuit 26 a request to read out a motion image file. As a result, creation of still image files is ended and a motion image file is read out of the SDRAM 28. The motion image file thus read is recorded onto a memory card 36 through a bus 24 and I/F circuit 34. Incidentally, the technique that one motion image file is created by performing successive JPEG compression on still image data of a plurality of screens is a well-known technique called a motion JPEG.

If the mode change switch 50 is switched to a "REPRODUCE" side, the system controller 42 sets for a reproduce mode. The CPU 32 reads a desired motion image file from the memory card 30 and sends a write request to the memory control circuit 26. As a result, the motion image file thus read is stored into the SDRAM 28. The CPU 32 further instructs the JPEG CODEC 30 to decompress a head-positioned still image file. The JPEG CODEC 30, each time it is given one decompression instruction, sends to the memory control circuit 26 a request to read a desired still image file, and performs JPEG decompression on a still image file thus read. Due to this, immediately after setting a reproduce mode, decompression is made on a still image file accommodated at the top of the motion image file.

The decompressed still image data is again written to the SDRAM 28 by the memory control circuit 26, and thereafter read out through the interlace scan scheme by the same memory control circuit 26. The request to write the decompressed data to the SDRAM 28 is supplied from the JPEG CODEC 30 to the memory control circuit 26 when the decompression process has been ended. On the other hand, the request to read still image data from the SDRAM 28 is supplied from a video encoder 38 to the memory control circuit 26. The video encoder 38 converts the read still image data into a composite video signal, according to an NTSC format. As a result, the head-positioned still image is displayed on the monitor 40. Incidentally, the JPEG CODEC 30 is provided with an end signal generating circuit 30*a* so that the end signal generating circuit 30*a* can supply an end signal to the CPU 32 each time decompression of one still image file is ended.

If the operator depresses a set button 46, the CPU 32 instructs the JPEG CODEC 30 to decompress a next still image file in response to a vertical synchronizing signal outputted from the SG 16. The JPEG CODEC 30, in turn, requests the memory control circuit 26 to read out a next still image file and performs decompression on a still image file thus read. The still image data obtained through decompression is also temporarily written to the SDRAM 28, and thereafter inputted to the video encoder 38. In this manner, when the set button 46 is depressed, the remaining still image files are reproduced from the SDRAM 28 in response to vertical synchronizing signals. The decompressed still image data is created on a 1-frame period basis. The motion images following the head-positioned still image are displayed on the monitor 40. The operation of the set button 46 in the state the head still image is being displayed signifies an instruction to normally reproduce motion images. Responsive to the normal reproduce instruction, reproduction is made at a normal rate on the motion images following the current still image.

In the course of normally reproducing motion images if a right-directed cursor button 44*b* is depressed, the CPU 32 outputs an instruction to decompress a next still image file in response to an end signal outputted from the JPEG CODEC 30. That is, when a normal reproduce instruction is given, the JPEG CODEC 30 perform decompression in response to a vertical synchronizing signal. However, if the cursor button 44*b* is operated, the JPEG CODEC 30 performs decompression in response to an end signal. Due to this, a decompression process in the present time is started immediately after ending the preceding decompression process, thus eliminating vacant time during decompression. The JPEG CODEC 30 operates similarly to the above, regardless of timing of decompression instruction. That is, in response to a decompression instruction, a request is made to the memory control circuit 26 to read out a still image file to be decompressed and to write the still image data thus decompressed. In this manner, after operating the cursor button 44*b*, each still image file is decompressed at a rate faster than that of normal reproduction, thus being displayed on the monitor 40. The still image being displayed on the monitor 40 is updated at timing faster than that of normal reproduction. That is, motion images are reproduced at high speed.

If the cursor button 44*b* is again depressed, the CPU makes ineffective the end signal and enables again the vertical synchronizing signal. That is, the CPU 32 outputs a decompression instruction in response to a vertical synchronizing signal, instead of an end signal. As a result, the reproduction rate of a motion image is brought back to the normal rate. In this manner, once motion image reproduction is started, the reproduction rate is switched between normal rate and high rate in response to operation of the cursor button 44*b*. Thus, the operation of the cursor button 44*b* in the course of reproducing motion images signifies a change in reproduction rate of motion images.

If the left-directed cursor button 44*a* is depressed in the course of reproducing motion images in a forward direction, the motion image reproduction is changed to reverse in direction. Regardless of whether the forward reproduction rate is at normal speed or high speed, if the cursor button 44*a* is depressed, then motion images are reproduced at a normal speed in the reverse direction. After starting reverse reproduction, whenever the cursor button 44*a* is depressed, the reproduction rate is switched between normal speed and high speed. The operation of the cursor button 44*a* in the course or reproducing motion images also signifies a change of reproduction rate.

Incidentally, where the left-directed cursor button 44*b* is depressed in the course of reverse reproducing motion images also provides inversion of reproduction direction similarly to the above, providing reproduction at normal rate.

Figure 2:
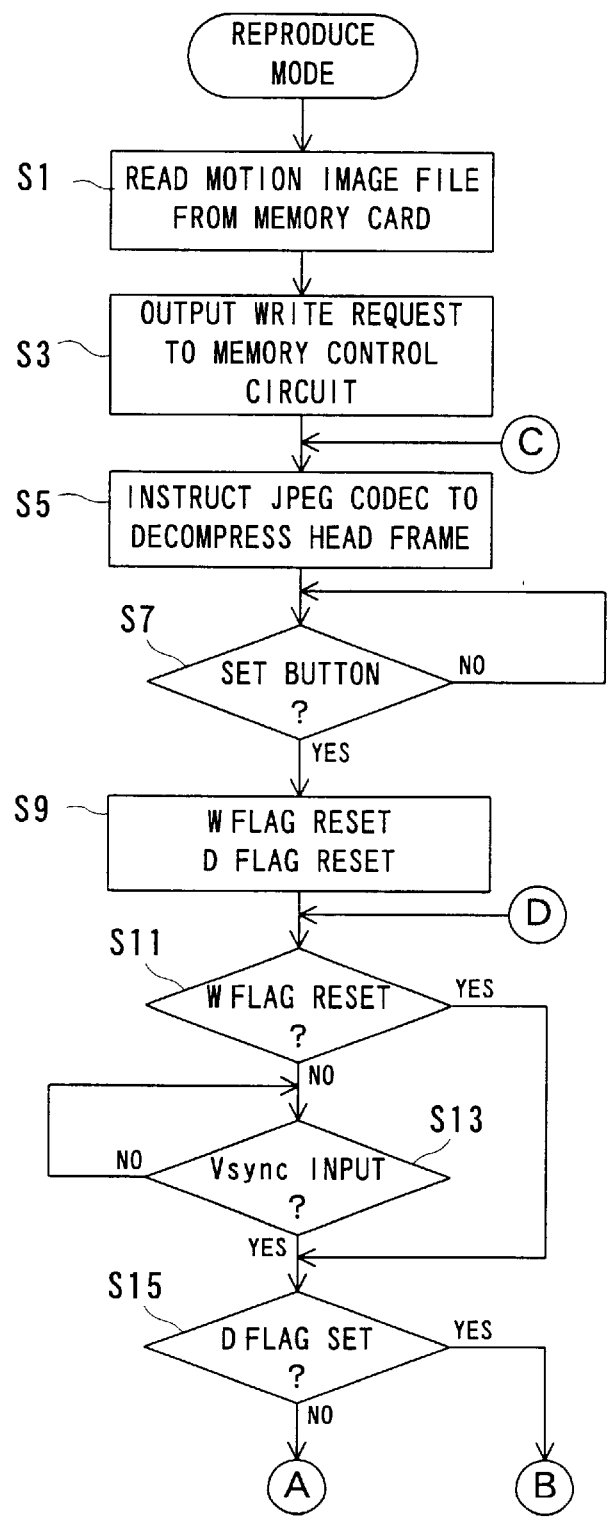
FIG. 2 is a flowchart showing one part of operation of the FIG. 1 embodiment.
Figure 3:
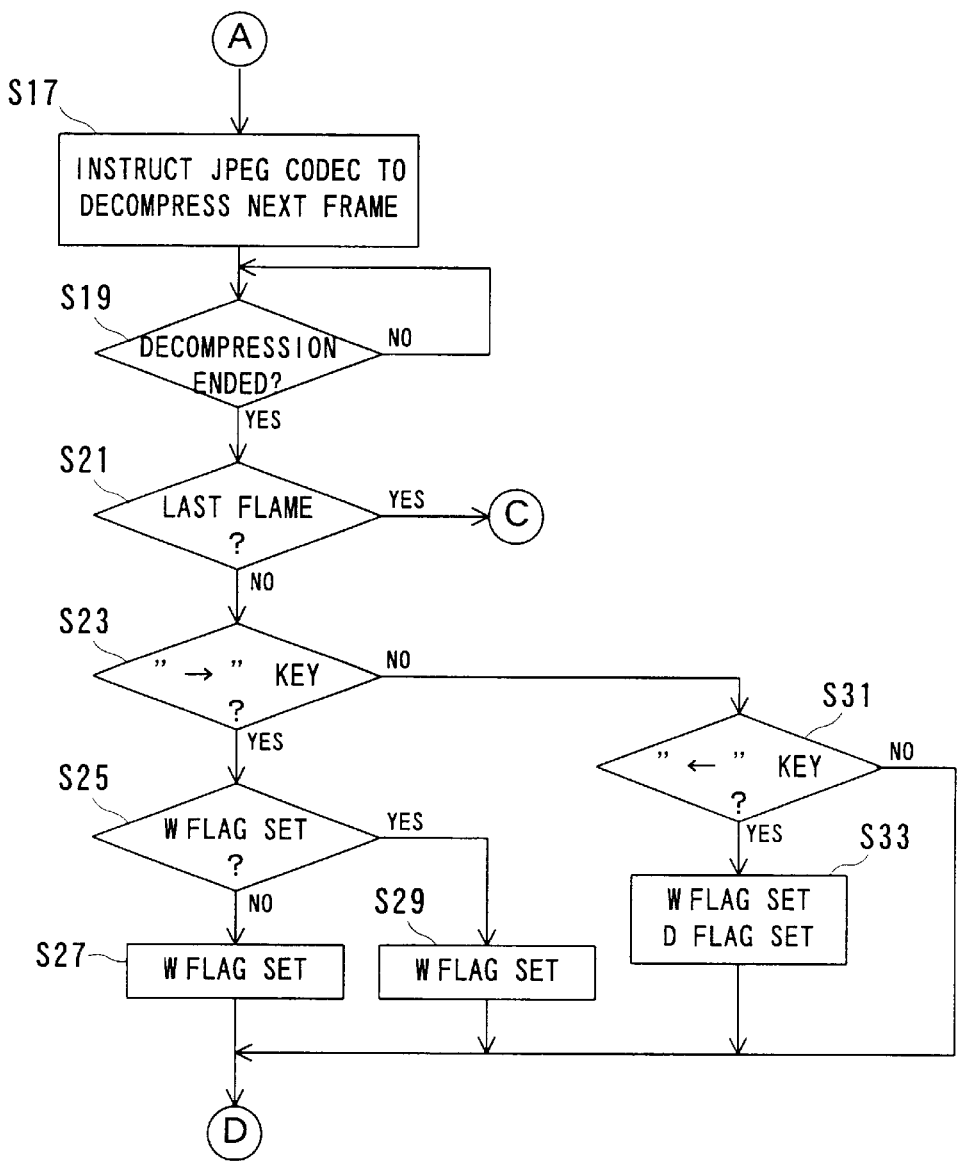
FIG. 3 is a flowchart showing another part of operation of the FIG. 1 embodiment.
Figure 4:
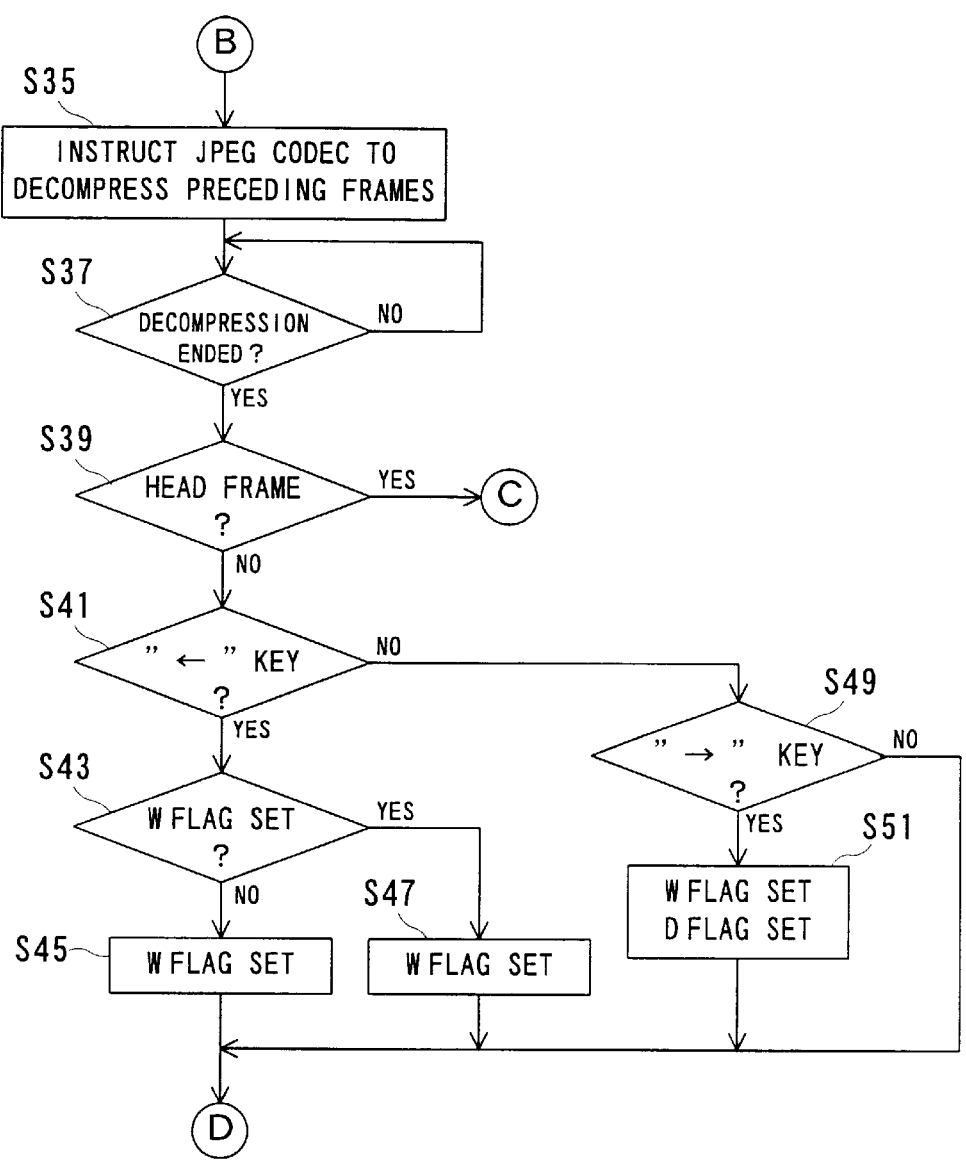
FIG. 4 is a flowchart showing still another part of operation of the FIG. 1 embodiment.

The processing by the CPU 32 in a reproduce mode will be explained with reference to a flowchart shown in FIG. 2 to FIG. 4.

The CPU 32 in step S1 first reads a desired motion image file (newest motion image file) from the memory card 36, and outputs in step S3 a write request to the memory control circuit 26. As a result, a motion image file thus read is written to the SDRAM 28. In step S5, the JPEG CODEC 30 is instructed to decompress a still image file accommodated in a head of the motion image file. The JPEG CODEC 30 requests the memory control circuit 26 to read out the head still image file in response to this decompression instruction, and decompressed a read still image file. The JPEG CODEC 30 also requests the memory control circuit 26 to write the decompressed still image data, thereby storing the still image data again to the SDRAM 28. This still image data is read out in response to a read request from the video encoder 38. As a result, the head still image is displayed on the monitor 40.

The CPU 32 subsequently determines in step S7 whether the set button 46 has been depressed or not. If the operator operates the set button 46, then in step S7 "YES" is determined and in step S9 reset is made for a W flag 32a indicative of a reproducing rate and a D flag 32b indicative of a reproducing direction. The states of reset and set of the W flag 32a respectively mean normal rate and high rate, while the states of reset and set of the D flag 32b respectively mean a forward direction and a reverse direction. In step S11 a state of the W flag 32a is determined. If the W flag 32a is in a set state, the process advances directly to step S15, while if in a reset state the process advances to step S15 through step S13. In the step S13 determination is made on the presence or absence of a vertical synchronizing signal input. If there is an input is determined, the process advances to the step S15.

Because the W flag 32a is reset responsive to operation of the set button 46, immediately after depressing the set button 46 the process advances to the step S15 after waiting for a vertical synchronizing signal input. In the step S15 a state of the D flag 32b is determined. If in a reset state, the process proceeds to step S17 of FIG. 3, while if in a set state the process advances to step S35 of FIG. 4.

When the D flag 32b is in a reset state, the CPU 32 in step S17 instructs the JPEG CODEC 30 to decompress a next still image file. The JPEG CODEC 30 responds to this command and reads out a next still image file in the same procedure as the above, performing a decompression process. As a result, a next still image is displayed on the monitor 40. The end signal generating circuit 30a provided in the JPEG CODEC 30 generates end signals each time decompression is completed for one still image file. The CPU 32 when given this end signal determines that the instructed decompression process has been ended. That is, in step S19 "YES" is determined.

In step S21 it is determined whether the decompressed still image file is a file accommodated at a last of the motion picture file. If it is a last end file, the CPU 32 brings the process back to the step S5. As a result, a head still image file is again reproduced. That is, after reproducing a motion image, a head still image is displayed again on the monitor 40. On the other hand, if not a last end file, the CPU 32 in respective steps S23 and S31 determine the presence or absence of operations of the cursor buttons 44b and 44a.

If the cursor button 44b is operated, the CPU 32 in step S23 determines "YES", and in steps S25–S29 inverts the state of W flag 32a. That is, in step S25 a state of W flag 32a is determined. If in a reset state, in step S27 the W flag 32a is changed to a set state, while if in a set state, then in step S29 the W flag 32a is changed to a reset state. Then the process returns to the step S11. When the cursor button 44a is operated, the CPU 32 in step S31 determines "YES", and in step S33 resets the W flag 32a and sets the D flag 32b. Then the process returns to the step S11. Incidentally, if neither the cursor button 44a nor 44b are operated, the process returns directly to the step S11.

If "YES" is determined in the step S15 of FIG. 1, the CPU 32 executes the processes of step S35 and the subsequent. The processes of the step S35–S51 are similar to those of step S17–S33 except in that in the step S35 instructed is decompression of the previous still image files, in the step S39 determination is made whether a decompressed still image file is a head file or not, in the steps S41 and S49 determinations are made as to the presence or absence of operation of the cursor buttons 44a and 44b, and in the step S51 both the W flag 32a and the D flag 32b are reset. Accordingly, explanations are omitted or duplicated portions.

If the cursor button 44b is once depressed in the course of normally reproducing motion images in the forward direction, then in step S27 the W flag 32a is set. Due to this, in step S11 "YES" is determined at all times, and an instruction to decompress a next still image file is outputted without waiting for a vertical synchronizing signal input. Thereafter, instruction is made to compress the following still image files each time a decompression process is ended. Thus, still image files are decompressed without intervals. That is, motion images are reproduced at high rate in the forward direction.

If the cursor button 44b is again depressed in the course of high speed reproduction in the forward direction, then in step S29 the W flag 32a is reset. Due to this, in step S11 "NO" is determined at all times. The still image files are decompressed each time a vertical synchronizing signal is inputted. That is, the reproduction rate of motion images returns to the normal rate.

If the cursor button 44a is depressed in the course of high speed or normal reproduction of motion images in the forward direction, then in step S33 the W flag 32a is reset and the D flag 32b is set. Accordingly, outputted is an instruction to decompress a still image file in advance of the current still image in response to a vertical synchronizing signal input. Motion images are reproduced at a normal rate in the reverse direction. If in this state the cursor button 44a is again depressed, in step S45 the W flag 32a is set and the reproduction rate in the reverse direction is switched to a high rate. If the cursor button 44a is further depressed, in step S47 the W flag 32a is reset to return the reverse reproduction rate from high speed to normal speed. Incidentally, when the reproduction is returned to a head of the motion image file, "YES" is determined in step S39 with a result that a head still image is kept in display.

Accordingly to this embodiment, when normal reproduction is instructed, the still image files are started of decompression in response to an input of a vertical synchronizing signal. On the other hand, when high speed reproduction is instructed, another still image file is started of decompression in response to a completion of decompressing one still image file. Due to this, even where any reproduction rate is set, it is possible to reproduce all the still image files accommodated in a motion image file. That is, the operator can positively get access to a desired still image.

Incidentally, although in this embodiment explanation was made only on a case of recording motion images, it is needless to say that recording of still images is also possible because the compression process of a shot image is according to the JPEG format. Also, although in this embodiment explanation was made using the digital camera, this invention is of course applicable to any image reproducing apparatus for reproducing a motion image file created using the motion JPEG.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reproducing apparatus for continuously reproducing a plurality of screens of image data recorded in a compression state, comprising:

a decompressor for decompressing one screen of image data in response to a decompression instruction;

a first generator for generator the decompression instruction at a predetermined interval when a normal reproduction is instructed; and a second generator for generating the decompression instruction at each time that one screen of image data has been decompressed when a high speed reproduction is instructed, wherein a time period necessary for decompressing one screen of image data is shorter than the predetermined interval.

2. An image reproducing apparatus according to claim 1, further comprising an outputter for outputting a timing signal at the predetermined interval, wherein said first generator generates the decompression instruction in response to the timing signal.

3. An image reproducing apparatus according to claim 1, wherein said decompressor includes an end signal outputter to output an end signal at each time that one screen of image data has been decompressed, and said second generator generating the decompression instruction in response to the end signal.

4. An image reproducing apparatus according to claim 1, further comprising a memory controller for writing the plurality of screens of image data to a memory in response to setting a reproduce mode and transferring one screen of image data from said memory to said decompressor based on the decompression instruction.

5. An image reproducing apparatus according to claim 1, wherein the plurality of screens of image data are data having been compressed on a screen-by-screen basis with using a JPEG scheme.

6. An image reproducing apparatus according to claim 1, wherein the plurality of screens of image data constitute a motion image.

7. An image reproducing apparatus for continuously reproducing a plurality of screens of image data recorded in a compression state, comprising:

a decompressor for decompressing one screen of image data in response to a decompression instruction;

a first generator for generating the decompression instruction at a predetermined interval based on waiting for a vertical synchronizing signal when a normal reproduction is instructed; and a second generator for generating the decompression instruction at each time that one screen of image data has been decompressed without waiting for the vertical synchronizing signal when a high speed reproduction is instructed.

* * * * *